United States Patent
Obara

(10) Patent No.: US 6,625,091 B2
(45) Date of Patent: Sep. 23, 2003

(54) OPTICAL PICKUP

(75) Inventor: Masato Obara, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 90 days.

(21) Appl. No.: 09/843,322

(22) Filed: Apr. 25, 2001

(65) Prior Publication Data

US 2001/0055265 A1 Dec. 27, 2001

(30) Foreign Application Priority Data

May 8, 2000 (JP) ........................................ 2000-134968

(51) Int. Cl.$^7$ ................................................. G11B 7/00
(52) U.S. Cl. .............................. 369/44.14; 369/44.15; 369/813; 369/823
(58) Field of Search ........................... 369/44.14, 44.15, 369/44.16, 44.19, 44.21, 44.22, 112.01, 112.23; 359/813, 814, 823, 824

(56) References Cited

U.S. PATENT DOCUMENTS 5,508,851 A * 4/1996 Tachizawa .................. 359/813
5,850,313 A * 12/1998 Miyagi et al. ........... 369/44.15
6,034,940 A    3/2000 Lee .............................. 369/244

* cited by examiner

Primary Examiner—Muhammad Edun
(74) Attorney, Agent, or Firm—Brinks Hofer Gilson & Lione

(57) ABSTRACT

An optical pickup including an actuator having a holder supporting portion for movably supporting a lens holder with an objective lens via a supporting member, a base member for mounting the holding supporting portion thereon, and an electromagnetic driving section for driving the lens holder in at least the focusing direction, an optical chassis for mounting the base member thereon, a light-emitting element for emitting a light beam to a disc via the objective lens, and a light receiving element for receiving the feedback light beam from the disc. The base member has a through hole formed at a position opposing the bottom surface of the lens holder and having such a size that the lens holder can be loosely fitted therein. The optical chassis has a stopper portion opposing the bottom surface of the lens holder via the through hole so as to regulate the allowable amount of movement of the lens holder toward the side opposite from the disc in the focusing direction. Accordingly, the total thickness of the optical pickup may be reduced.

18 Claims, 6 Drawing Sheets

OPTICAL PICKUP

BACKGROUND OF THE INVENTION

1. Field of the Invention

The present invention relates to an optical pickup for recording and/or reproducing signals on and from discs, such as CDs (compact discs), MD (minidiscs), and DVD (digital versatile discs), and more particularly, to an optical pickup which is suitably reduced in size.

2. Description of the Related Art

A typical type of optical pickup generally comprises an optical chassis in which a light-emitting element and a light-receiving element are mounted, an actuator held on the optical chassis so as to mount thereon a lens holder having an objective lens, and a cover for enclosing the actuator with the objective lens exposed therefrom. The actuator is provided with an electromagnetic driving section for driving the lens holder in the focusing and tracking directions of a disc. Such an optical pickup is incorporated in optical disc players, such as CD players. A light beam emitted from the light-emitting element, such as a semiconductor laser, is collected by the objective lens, and the feedback light beam from the disc is passed through the objective lens and is received by the light-receiving element.

FIG. 9 is an exploded perspective view of an example of this type of optical pickup, FIG. 10 is a plan view of an actuator used in the optical pickup, and FIG. 11 is a cross-sectional view of the actuator. The optical pickup shown in these figures generally comprises an optical chassis 1 made of a metal material, such as aluminum, an actuator 4 held on the optical chassis 1 so as to mount thereon a lens holder 3 having an objective lens 2, and a cover 5 for enclosing the actuator 4 with the objective lens 2 exposed therefrom.

The optical chassis 1 is driven in the radial direction of a disc D along a guide shaft G (see FIGS. 7 and 8). An upright portion 6 vertically standing on a bottom plate 1d has a large-diameter mounting hole 7 and a small-diameter through hole (not shown) connected thereto. A light emitting and receiving device (hologram unit) 8 composed of a combination of a semiconductor laser (light-emitting element) and a photodetector (light-receiving element) is held inside the mounting hole 7. The light emitting and receiving device 8 is covered with a support plate 9 which is screwed to the outer side face of the upright portion 6 of the optical chassis 1. The light emitting and receiving device 8 is connected to a signal processing circuit (not shown) via a flexible printed circuit board 10a. A reflecting mirror 11 is fixed at a mounting angle of 45° at about the center of the bottom plate 1d of the optical chassis 1. A light beam emitted from the light emitting and receiving device 8 passes through the through hole, is reflected in the vertical direction (upward in FIG. 9) by the reflecting mirror 11, and travels toward the disc D. The feedback light beam reflected by the disc D is reflected in the horizontal direction by the reflecting mirror 11, passes through the through hole, and is received by the light emitting and receiving device 8.

The actuator 4 comprises a lens holder 3 having an objective lens 2 and a focusing coil FC and a plurality of tracking coils TC wound thereon, a holder supporting portion 13 for elastically supporting the lens holder 3 via a plurality of wires 12 (supporting members), a magnet holder 15 having a stopper face 15a and stopper walls 15b for regulating the allowable amount of movement of the lens holder 3, and a pair of magnets 14 mounted thereon, and a base member 16 for fixedly mounting the magnet holder 15 and the holder supporting portion 13 thereon.

The base member 16 also functions as a magnetic yoke. An electromagnetic driving section constituted by the base member 16, the magnets 14, the focusing coil FC, and the tracking coils TC drives the lens holder 3 in the focusing direction (upward and downward direction in FIGS. 9 and 11) and in the tracking direction (upward and downward direction in FIG. 10) of the disc D. These components of the actuator 4 are covered with a dustproof cover 5 which is attached to the holder supporting portion 13 or the base member 16 by snap fitting or by other means. Since the upper surface of the cover 5 has an opening 5a for exposing the objective lens 2 therefrom, it will not interfere with the passage of light beams. A flexible printed circuit board 10b mounted on the holder supporting portion 13 is electrically connected to the coils FC and TC via the wires 12.

The actuator 4 is placed on the bottom plate 1d of the optical chassis 1, a mounting screw 18 passed through a coil spring 17 is inserted into a hole formed in the base member 16 from above and is screwed into the optical chassis 1, and two adjusting screws 19 are passed through holes formed in the optical chassis 1 from below and are screwed into the base member 16, thereby fixing the base member 16 to the optical chassis 1 in a state in which the optical axis of the objective lens 2 is adjusted. The optical axis of the objective lens 2 positioned directly above the reflecting mirror 11 must be perpendicular to the recording surface of the disc D in order to precisely record/reproduce signals on and from the recording surface. Since the lens holder 3 is supported on the base member 16 via the wires 12 and the holder supporting portion 13, the lens holder 3 and the base member 16 are inevitably placed in a slightly twisted positional relationship (a relationship in which the bottom surface of the lens holder 3 and the bottom surface of the base member 16 are not in parallel with each other) in the step of assembling the actuator 4. For this reason, the optical axis of the objective lens 2 must be adjusted when mounting the actuator 4 on the optical chassis 1. An operation of adjusting the optical axis will be described specifically. An annular spherical face 20 centered on the optical axis of the objective lens 2 is formed at the bottom of the base member 16, as shown in FIG. 11, and an annular bearing face 1e is formed on the bottom plate 1d of the optical chassis 1. By rotating the two adjusting screws 19, the base member 16 is rocked on the optical chassis 1 with the spherical face 20 and the bearing face 1e used as sliding faces, and the mounting attitude (inclination) of the actuator 4 is adjusted so that the optical axis of the objective lens 2 is perpendicular to the recording surface of the disc D.

When the lens holder 3 elastically supported by a plurality of wires 12 is moved excessively, the resilient force of the wires 12 may be reduced. Therefore, the magnet holder 15 as a component of the actuator 4 is provided with a stopper face 15a for regulating the allowable amount of movement of the lens holder 3 toward the side opposite from the disc (apart from the disc D) in the focusing direction, and a pair of stopper walls 15b for regulating the allowable amount of movement of the lens holder 3 in the tracking direction. When the lens holder 3 is moved to the lowermost point of the allowable moving range in the focusing direction, the bottom surface thereof abuts against the stopper face 15a, and further movement of the lens holder 3 is limited. When the lens holder 3 is moved to the limit of the allowable moving range in the tracking direction, the side face thereof abuts against the stopper wall 15b, and further movement of the lens holder 3 is limited. When the lens holder 3 is moved to the uppermost point of the allowable moving range in the focusing direction, the upper surface thereof abuts against the rim of the opening 5a of the cover 5, and further movement of the lens holder 3 is limited.

Recently, there has been a strong demand for further reducing the thickness of this type of optical pickup. In the above-described conventional optical pickup, the magnet holder 15, the base member 16, and the optical chassis 1 are stacked below the lowermost position of the lens holder 3. However, there are limitations in reducing the thicknesses of these stacked members, and the total thickness is undesirably large.

In this type of optical pickup, when the actuator 4 is mounted on the optical chassis 1, the optical axis of the objective lens 2 is adjusted so as to be perpendicular to the recording surface of the disc D. In this case, since the lens holder 3, the base member 16, and the magnet holder 15 in the above structure rock together, even if the base member 16 or the magnet holder 15 is in a twisted positional relationship with the lens holder 3 when assembling the actuator 4, the positional relationship remains unchanged after the adjustment of the optical axis of the objective lens 2 has been completed. Therefore, the assembly operation is completed in a state in which the bottom surface of the lens holder 3 and the stopper face 15a of the magnet holder 15 are not in parallel with each other. For this reason, in a case in which design is performed without consideration of such inclination, the minimum distance between the bottom surface of the lens holder 3 and the stopper face 15a is substantially smaller than the designed value. As a result, the lens holder 3 abuts against the stopper face 15a before it reaches the designed lowermost position, and this hinders focus servo.

Accordingly, it is conventionally necessary to design the distance between the bottom surface of the lens holder 3 and the stopper face 15a to allow for a slight inclination between the lens holder 3 and the stopper face 15a. This makes it more difficult to reduce the thickness of the optical pickup.

SUMMARY OF THE INVENTION

The present invention has been made in order to overcome the above problems, and an object of the invention is to provide a low-profile optical pickup in which the lowermost position of a lens holder can be determined accurately.

In order to achieve the above object, according to an embodiment of the present invention, an optical pickup is provided including an actuator having a holder supporting portion for movably supporting a lens holder with an objective lens via a supporting member, a base member for mounting the holding supporting portion thereon, and an electromagnetic driving section for driving the lens holder in at least the focusing direction, an optical chassis for mounting the base member thereon, a light-emitting element for emitting a light beam to a disc via the objective lens, and a light receiving element for receiving the feedback light beam from the disc. The base member has a through hole formed at a position opposing the bottom surface of the lens holder and having such a size that the lens holder can be loosely fitted therein. The optical chassis has a stopper portion opposing the bottom surface of the lens holder via the through hole so as to regulate the allowable amount of movement of the lens holder toward the side opposite the disc in the focusing direction.

In the optical pickup with such a configuration, when the lens holder is moved by a predetermined amount toward the side opposite from the disc (away from the disc) in the focusing direction, it enters the through hole of the base member, and the bottom surface thereof abuts against the stopper portion of the optical chassis. Further movement of the lens holder is thereby limited, and the abutting position is defined as the lowermost position of the lens holder. Accordingly, only the optical chassis is placed below the lowermost position of the lens holder, and thus the thickness of the optical pickup is reduced. For example, in a case in which the optical pickup is of a moving coil type, magnets may be directly mounted to the base member of the actuator, thereby reducing the number of components. Even when the lens holder and the base member of the actuator are in a twisted positional relationship during the assembly operation, the optical axis of the objective lens and the optical axis of the light beam reflected by the reflecting mirror are made to coincide with each other by adjusting the optical axis of the objective lens in the step of mounting the actuator on the optical chassis. Thus, the lens holder with the objective lens and the optical chassis with the reflecting mirror are automatically placed in a parallel positional relationship. Therefore, the distance between the stopper portion of the optical chassis and the bottom surface of the lens holder can be determined accurately. For this reason, the positional accuracy of the lowermost position of the lens holder is increased, and it is not necessary to make a design which allows for inclination of the stopper portion of the optical chassis with respect to the bottom surface of the lens holder. This makes it possible to reduce the thickness of the optical pickup.

Preferably, the optical chassis is provided with a regulating portion for regulating the allowable amount of movement of the lens holder in the tracking direction. This allows an optical pickup with a simple structure in which all the stopper members for regulating the amount of movement of the lens holder are mounted on the optical chassis.

Further objects, features, and advantages of the present invention will become apparent from the following description of the preferred embodiments with reference to the attached drawings.

DESCRIPTION OF THE PREFERRED EMBODIMENTS

Figure 9:
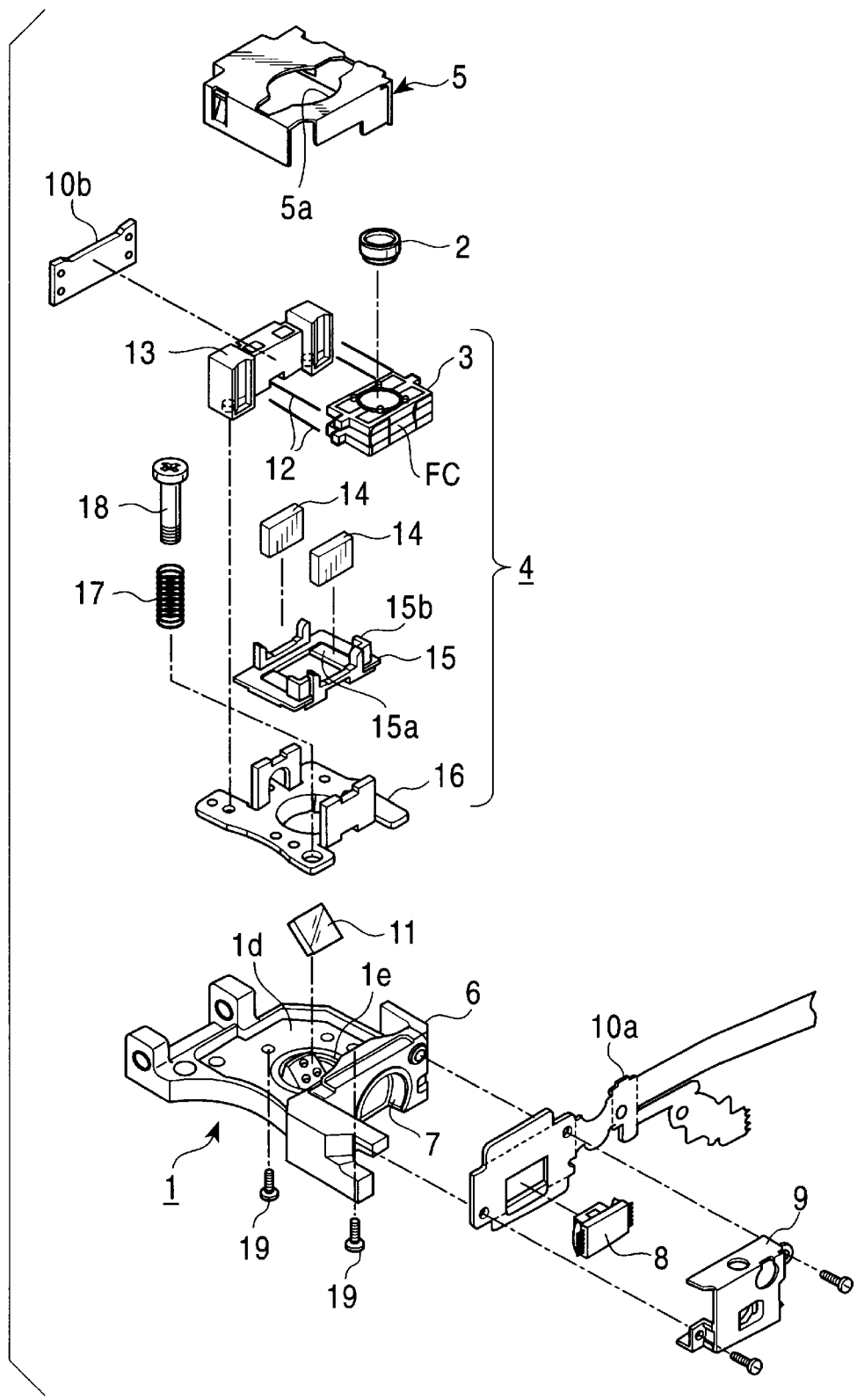
FIG. 9 is an exploded perspective view of a prior art optical pickup.
Figure 10:
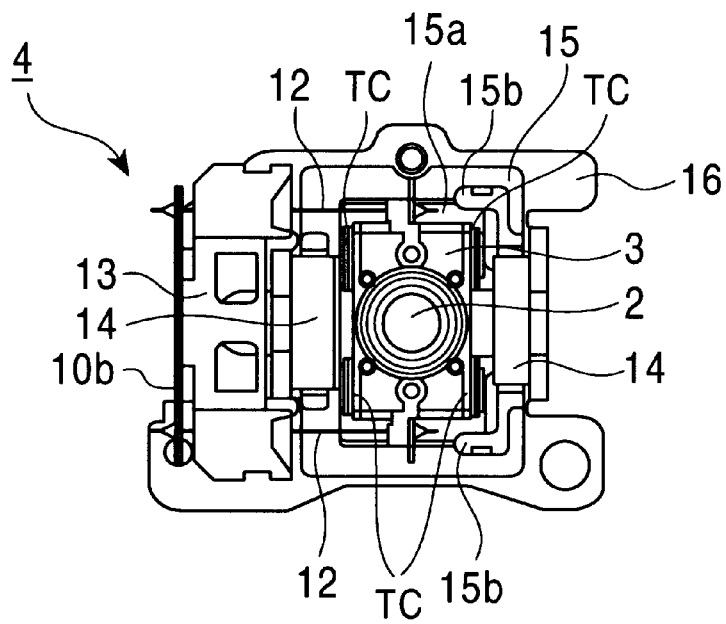
FIG. 10 is a plan view of an actuator provided in the prior art optical pickup.
Figure 11:
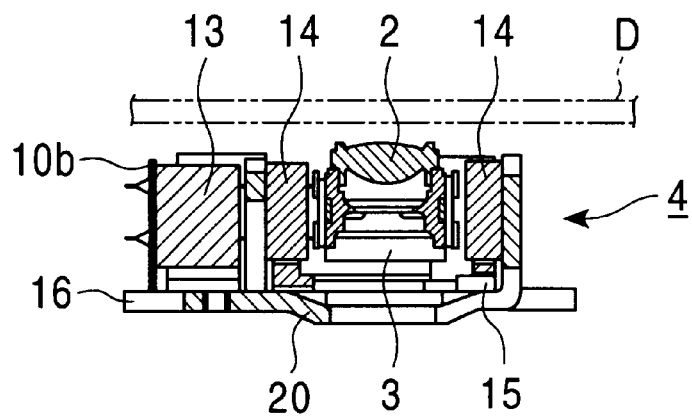
FIG.11 is a cross-sectional view of the actuator provided in the prior art optical pickup.

An embodiment of the present invention will be described below with reference to FIGS. 1 to 8. In FIGS. 1 to 8, components equivalent to those in FIGS. 9 to 11 are denoted by the same reference numerals, and repetitive descriptions thereof are omitted appropriately.

Figure 1:
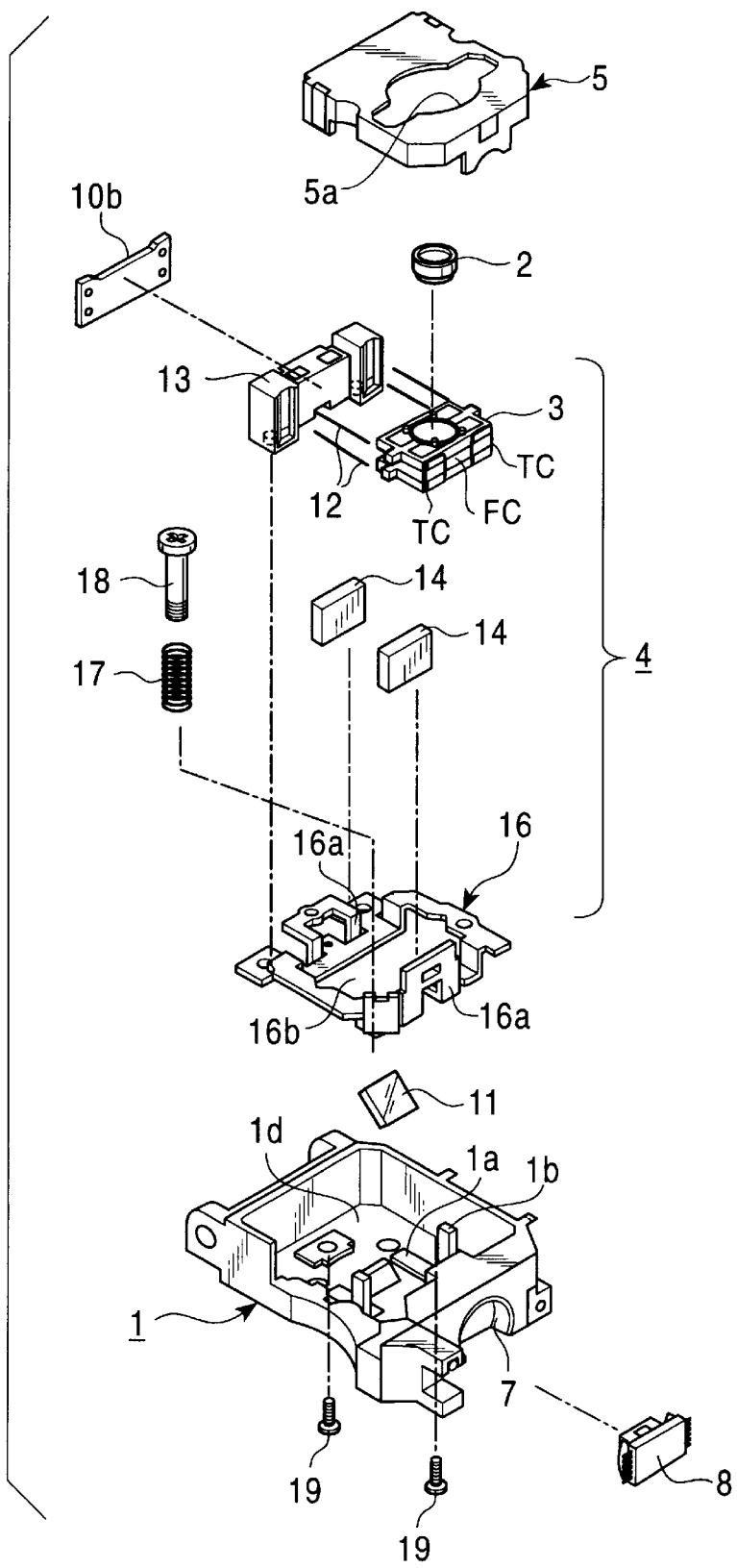
FIG. 1 is an exploded perspective view of an optical pickup according to an embodiment of the present invention.
Figure 7:
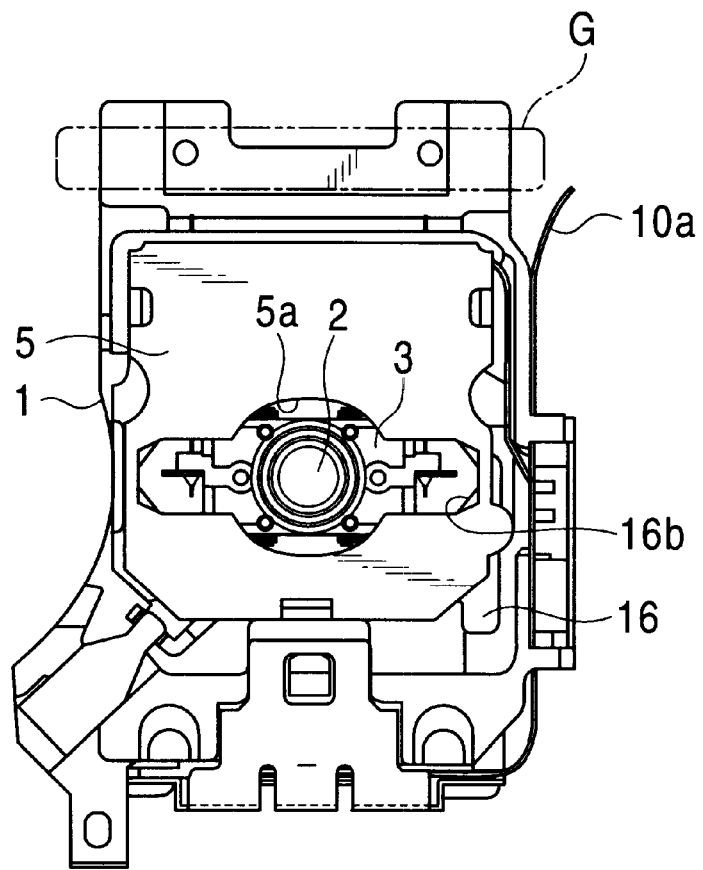
FIG. 7 is a general plan view of the optical pickup.
Figure 8:
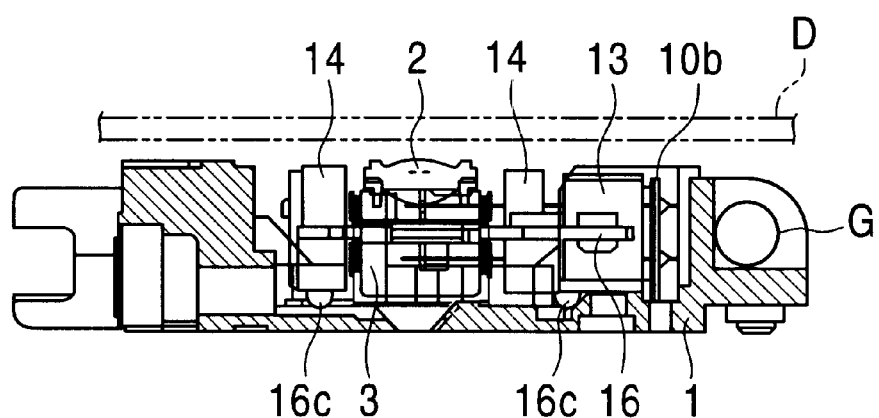
FIG. 8 is a cross-sectional view of the optical pickup from which a cover is omitted.

An optical pickup shown in FIGS. 1, 7, and 8 generally comprises an optical chassis 1 having a light emitting and receiving device 8 disposed in a mounting hole 7, an actuator 4 held on the optical chassis 1 and including a lens holder 3 with an objective lens 2 bonded thereto, and a cover 5 for enclosing the actuator 4 while the objective lens 2 is exposed therefrom.

Figure 2:
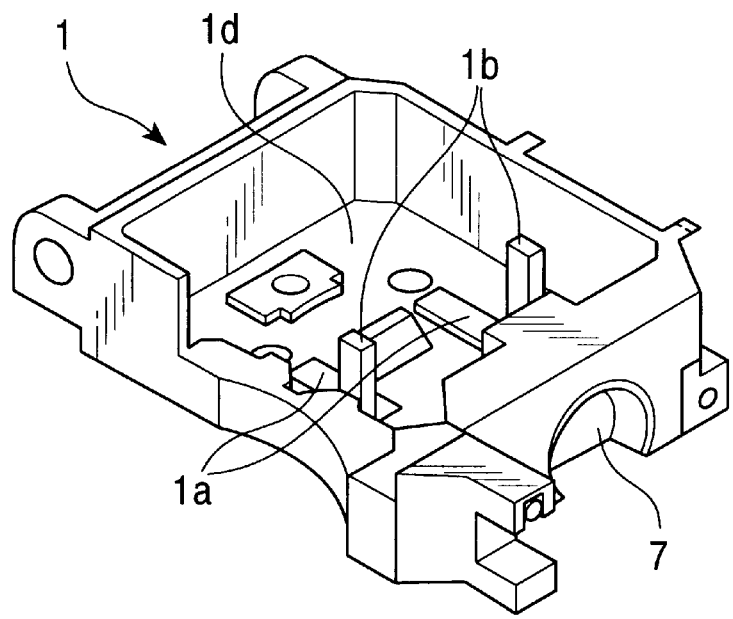
FIG. 2 is an enlarged view of an optical chassis provided in the optical pickup.
Figure 3:
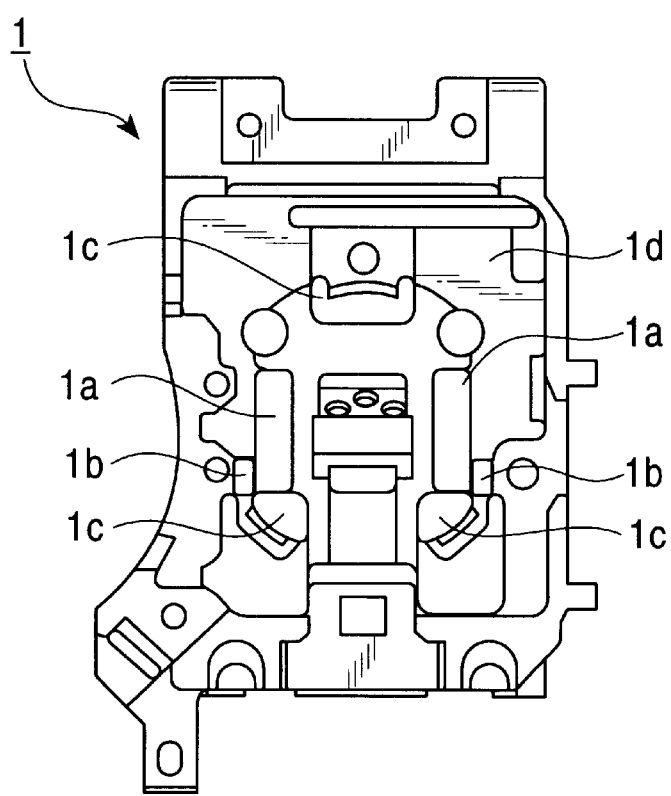
FIG. 3 is a plan view of the optical chassis.
Figure 4:
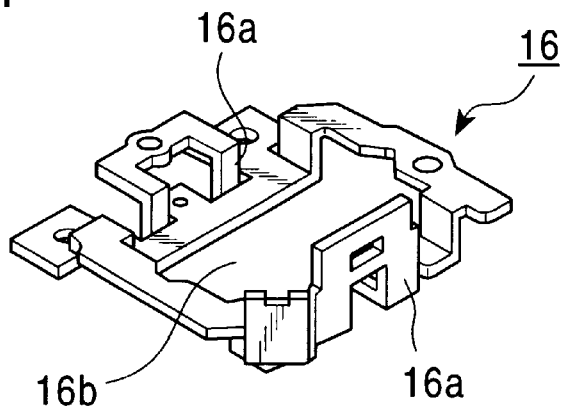
FIG. 4 is an enlarged view of a base member provided in the optical pickup.
Figure 5:
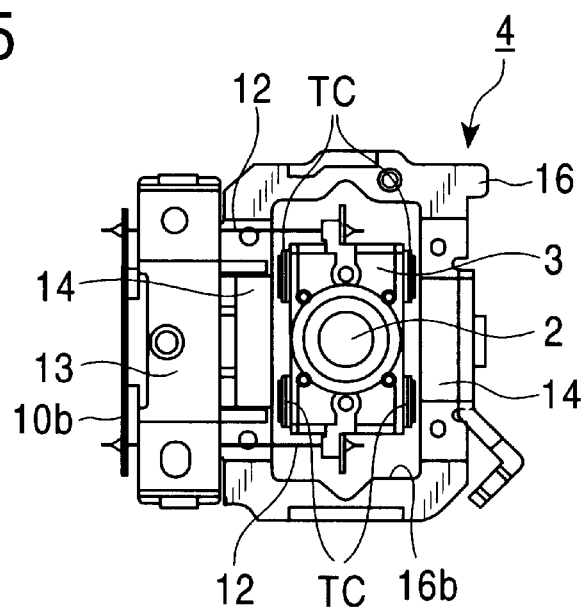
FIG. 5 is a plan view of an actuator provided in the optical pickup.
Figure 6:
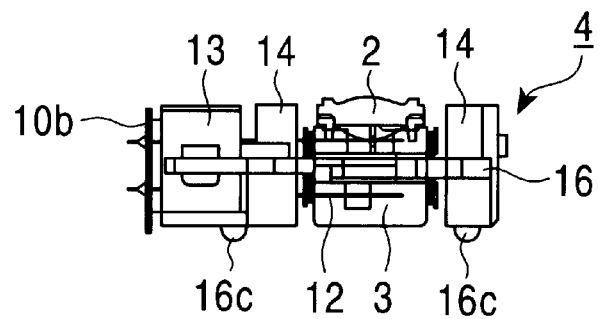
FIG. 6 is a side view of the actuator.

A reflecting mirror 11 is fixed at a mounting angle of 45° at about the center of a bottom plate 1d of the optical chassis 1. A light beam emitted from a semiconductor laser (light-emitting element) disposed in the light emitting and receiving device 8 is reflected in the vertical direction (upward direction in FIGS. 1 and 8) by the reflecting mirror 11, is collected by the objective lens 2, and is applied onto a recording surface of a disc D. The feedback light beam reflected by the recording surface of the disc D is passed through the objective lens 2, is reflected in the horizontal direction by the reflecting mirror 11, and is received by a photodetector (light-receiving element) in the light emitting and receiving device 8. As shown in FIG. 2, the bottom plate 1d of the optical chassis 1 is provided with a pair of stopper portions 1a for regulating the allowable amount of movement of the lens holder 3 toward the side opposite from the disc D (apart from the disc D) in the focusing direction (upward and downward direction in FIGS. 1 and 8), and a pair of stopper walls (regulating portion 1b for regulating the allowable amount of movement of the lens holder 3 in the tracking direction (upward and downward direction in FIG. 5).

The stopper portions 1a are formed integrally with the bottom plate 1d of the optical chassis 1 so as to slightly protrude therefrom. The upper surfaces of the stopper portions 1a are made flat nearly in parallel with the bottom surface of the lens holder 3 which will be described later. The stopper walls 1b are also formed integrally with the bottom plate 1d of the optical chassis 1, and vertically protrude therefrom by a greater amount than that of the stopper portions 1a.

The actuator 4 comprises the lens holder 3 with a focusing coil FC and a plurality of tracking coils TC wound thereon, a holder supporting portion 13 for elastically and movably supporting the lens holder 3 via a plurality of wires (supporting members) 12, and a base member 16 for mounting the holder supporting portion 13 thereon, in which a pair of magnet mounting portions 16a are provided with magnets 14. The magnet mounting portions 16a of the base member 16 also serve as magnetic yokes. An electromagnetic driving section constituted by the base member 16, the magnets 14, and the above coils (the focusing coil FC and the tracking coils TC) drives the lens holder 3 in the focusing and tracking directions of the disc D. The base member 16 also has a through hole 16b formed opposed to the bottom surface of the lens holder 3 and having such a size that the lens holder 3 can be loosely fitted therein. The stopper portions 1a of the optical chassis 1 and the bottom surface of the lens holder 3 are opposed to each other via the through hole 16b. While the components of the actuator 4 are covered with a dustproof cover 5 attached to the holder supporting portion 13 or the base member 16, since the cover 5 has an opening 5a for exposing the objective lens 2 therefrom, it will not interfere with the passage of light beams. In a case in which the lens holder 3 is moved to the uppermost point within the allowable moving range in the focusing direction, it abuts against the rim of the opening 5a of the cover 5 at its lower surface and is thereby prevented from further moving closer to the disc D. Thus, the allowable amount of movement of the lens holder 3 toward the disc D in the focusing direction is regulated by the cover 5. A flexible printed circuit board 10b mounted on the holder supporting portion 13 is electrically connected to the coils FC and TC via the wires 12.

When mounting the actuator 4 on the optical chassis 1, the base member 16 is held on the bottom plate 1d of the optical chassis 1 with a mounting screw 18 passed through a coil spring 17 and two adjusting screws 19 while the optical axis of the objective lens 2 is adjusted. More specifically, semi-spherical projections 16c (see FIGS. 6 and 8) are formed at three points at the bottom of the base member 16 so as to be arranged on the same circumference centered on the optical axis of the objective lens 2. The base member 16 is placed on the optical chassis 1 in a state in which the projections 16c are in contact with tapered faces 1c (see FIG. 3) formed at three points on the bottom plate 1d of the optical chassis 1. By rotating the two adjusting screws 19 screwed in the base member 16 from below the optical chassis 1, the projections 16c and the tapered faces 1c are slid in contact with each other, the base member 16 rocks on the optical chassis 1, and the mounting attitude (inclination) of the actuator 4 is adjusted so that the optical axis of the objective lens 2 is perpendicular to the recording surface of the disc D. In this case, even when the lens holder 3 and the base member 16 are in a twisted positional relationship (the bottom surface of the lens holder 3 and the bottom surface of the base member 16 are not in parallel with each other), the bottom surface of the lens holder 3 and the upper surface of the bottom plate 1d of the optical chassis 1 are automatically placed in parallel with each other by adjusting the optical axis of the objective lens 2 so as to be in parallel with the optical axis of a light beam perpendicularly reflected by the reflecting mirror 11. As a result, it is possible to accurately determine the distance between the upper surfaces of the stopper portions 1a of the optical chassis 1 and the bottom surface of the lens holder 3.

On the other hand, when the base member 16 is mounted on the optical chassis 1, the stopper walls 1b are passed through the through hole 16b of the base member 16 so as to be opposed to both side faces of the lens holder 3 in the tracking direction. The allowable amount of movement of the lens holder 3 in the tracking direction is regulated by the stopper walls 1b. As the urging member for pressing the base member 16 against the optical chassis 1, the coil spring 17 may be replaced with a leaf spring or the like.

As described above, in this embodiment, when the lens holder 3 is moved down toward the side opposite from the disc (downward in FIG. 1) by a predetermined amount in the focusing direction, it is entirely placed into the through hole 16b of the base member 16, the bottom surface of the lens holder 3 abuts against the stopper portions 1a of the optical chassis 1, and further movement toward the side opposite from the disc is thereby limited. Since it is satisfactory as long as only the optical chassis 1 is placed below 16 the lowermost position of the lens holder 3, the total height of the optical pickup is made smaller than before. While the magnet holder, the base member, and the optical chassis are stacked below the lowermost position of the lens holder in the optical pickup shown in FIG. 9, only the optical chassis 1 is disposed below the lowermost position of the lens holder 3 in the optical pickup of this embodiment. Therefore, the total thickness of the optical pickup of this embodiment reduced by an amount corresponding to the thicknesses of the magnet holder and the base member in the optical pickup shown in FIG. 9. Furthermore, the optical chassis 1 of this embodiment has not only the stopper portions 1a for regulating the lowermost position of the lens holder 3, but also the stopper walls 1b for regulating the allowable amount of movement of the lens holder 3 in the tracking direction, and the magnets 14 are directly mounted on the base member 16. Therefore, there is no need to incorporate the magnet holder having a stopper function as in the optical pickup shown in FIG. 9, and this reduces the number of components. Still further, since the upper surfaces of the stopper portions 1a of the optical chassis 1 and the bottom surface of the lens holder 3 can be placed in parallel with each other and the distance therebetween can be determined accurately in this embodiment, the positional accuracy of the lowermost position of the lens holder 3 is increased. Moreover, it is not necessary to make a design which allows for inclination of the bottom surface of the lens holder 3 with respect to the stopper portions 1a of the optical chassis 1, and size reduction can be promoted easily.

While the optical pickup of the above-described embodiment has a moving coil type electromagnetic driving section in which the coils FC and TC are wound on the lens holder 3 and the magnets 14 are fixed to the base member 16, the present invention is also applicable to an optical pickup having a moving magnet type electromagnetic driving section in which magnets are fixed to a lens holder and coils are fixed to a base member.

While the optical pickup of the above embodiment adopts the light emitting and receiving device 8 composed of a combination of the semiconductor laser (light-emitting element) and the photodetector (light-receiving element), the present invention is also applicable to an optical pickup in which a light-emitting element and a light-receiving element are separately mounted in an optical chassis.

In conclusion, the total thickness of an optical pickup may be reduced by utilizing a base member of the actuator having a through hole having such a size that the lens holder can be loosely fitted therein and is opposed to the bottom surface of the lens holder, an optical chassis having a stopper portion opposing the bottom surface of the lens holder via the through hole. Here, the allowable amount of movement of the lens holder toward the side opposite from the disc in the focusing direction is regulated by the stopper portion. Even when the lens holder and the base member are in a twisted (nonparallel) positional relationship, the lens holder and the optical chassis are placed in parallel with each other by adjusting the optical axis of the objective lens, no error will occur in the lowermost position of the lens holder due to the inclination of the stopper portion of the optical chassis with respect to the bottom surface of the lens holder.

In a case in which a pair of regulating portions stand on the optical chassis so as to pass through the through hole in order to regulate the allowable amount of movement of the lens holder in the tracking direction, an optical pickup with a simple structure can be obtained in which all the stoppers for the lens holder are provided in the optical chassis.

While the present invention has been described with reference to what is presently considered to be the preferred embodiment, it is to be understood that the invention is not limited to the disclosed embodiment. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An optical pickup comprising:
   an actuator having a holder supporting portion for movably supporting a lens holder with an objective lens via a supporting member, a base member for mounting said holding supporting portion thereon, and an electromagnetic driving section for driving said lens holder in at least the focusing direction; and
   an optical chassis for mounting said base member thereon and having a light-emitting element for emitting a light beam to a disc via said objective lens and a light receiving element for receiving the feedback light beam from said disc,
   wherein said base member has a through hole formed at a position opposing the bottom surface of said lens holder and having such a size that said lens holder can be loosely fitted therein, and said optical chassis has a stopper portion opposing the bottom surface of said lens holder via said through hole so as to regulate the allowable amount of movement of said lens holder toward the side opposite from said disc in the focusing direction.

2. An optical pickup according to claim 1, wherein said base member is placed on said optical chassis so that the inclination of the base member is adjustable.

3. An optical pickup according to claim 1, wherein a surface of said stopper portion opposing said lens holder is made flat so as to be nearly in parallel with the bottom surface of said lens holder.

4. An optical pickup according to claim 1, wherein said stopper portion is formed integrally with a bottom plate of said optical chassis so as to protrude therefrom.

5. An optical pickup according to claim 1, wherein said optical chassis is provided with a regulating portion for regulating the allowable amount of movement of said lens holder in a tracking direction.

6. An optical pickup according to claim 5, wherein a pair of said regulating portions are operable to extend through said through hole toward both sides of said lens holder in the tracking direction.

7. An optical pickup according to claim 5, wherein said regulating portion is formed integrally with a bottom plate of said optical chassis so as to protrude therefrom.

8. An optical pickup comprising:
   an actuator having a holder supporting portion for movably supporting a lens holder with an objective lens via a supporting member, a base member for mounting said holding supporting portion thereon, and an electromagnetic driving section for driving said lens holder in at least the focusing direction; and
   an optical chassis for mounting said base member thereon so that the inclination thereof is adjustable, and having a light-emitting element for emitting a light beam to a disc via said objective lens and a light receiving element for receiving the feedback light beam from said disc,
   wherein said base member has a through hole formed at a position opposing the bottom surface of said lens holder and having such a size that said lens holder can be loosely fitted therein, and said optical chassis has a stopper portion opposing the bottom surface of said lens holder via said through hole operable to regulate the allowable amount of movement of said lens holder toward the side opposite from said disc in the focusing direction.

9. An optical pickup according to claim 8, wherein a surface of said stopper portion opposing said lens holder is made flat is substantially parallel with the bottom surface of said lens holder.

10. An optical pickup according to claim 8, wherein said stopper portion is formed integrally with a bottom plate of said optical chassis.

11. An optical pickup according to claim 8, wherein said optical chassis is provided with a regulating portion for regulating the allowable amount of movement of said lens holder in the tracking direction.

12. An optical pickup according to claim 11, wherein a pair of said regulating portions are operable to extend through said through hole toward both sides of said lens holder in the tracking direction.

13. An optical pickup according to claim 11, wherein said regulating portion is formed integrally with a bottom plate of said optical chassis.

14. An optical pickup comprising:

an actuator having a holder supporting portion for movably supporting a lens holder with an objective lens via a supporting member, a base member for mounting said holding supporting portion thereon, and an electromagnetic driving section for driving said lens holder in at least the focusing direction; and an optical chassis for mounting said base member thereon so that the inclination thereof is adjustable, and having a light-emitting element for emitting a light beam to a disc via said objective lens and a light receiving element for receiving the feedback light beam from said disc, wherein said base member has a through hole formed at a position opposing the bottom surface of said lens holder and having such a size that said lens holder can be loosely fitted therein, said optical chassis has a stopper portion opposing the bottom surface of said lens holder via said through hole operable to regulate the allowable amount of movement of said lens holder toward the side opposite from said disc and a regulating portion opposing the side face of said lens holder operable to regulate the allowable amount of movement of said lens holder in the tracking.

15. An optical pickup according to claim 14, wherein a surface of said stopper portion opposing said lens holder is substantially parallel with the bottom surface of said lens holder.

16. An optical pickup according to claim 15, wherein said stopper portion is formed integrally with a bottom plate of said optical chassis.

17. An optical pickup according to claim 14, wherein a pair of said regulating portions are operable to extend through said through hole toward both sides of said lens holder in the tracking direction.

18. An optical pickup according to claim 14, wherein said regulating portion is formed integrally with a bottom plate of said optical chassis.

* * * * *